United States Patent
Woolf

(10) Patent No.: US 6,517,772 B1
(45) Date of Patent: Feb. 11, 2003

(54) APPARATUS AND METHOD FOR FORMING POWDER METAL GEARS

(75) Inventor: Richard Woolf, Cincinnati, OH (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/965,710

(22) Filed: Sep. 26, 2001

(51) Int. Cl.[7] .................................................. B22F 3/12
(52) U.S. Cl. ......................................................... 419/28
(58) Field of Search .......................................... 419/28

(56) References Cited

U.S. PATENT DOCUMENTS

| | | |
|---|---|---|
| 1,847,848 A | 3/1932 | Ragan |
| 2,200,584 A | 5/1940 | Simmons |
| 2,207,438 A | 7/1940 | Miller |
| 2,214,225 A | 9/1940 | Drummond |
| 2,227,491 A | 1/1941 | Drummond |
| 2,445,649 A | 7/1948 | Turner et al. |
| 2,711,673 A | 6/1955 | Miller |
| 2,863,360 A | 12/1958 | Praeg |
| 3,103,143 A | 9/1963 | Perger |
| 3,212,404 A | 10/1965 | Becher |
| 3,659,335 A | 5/1972 | Bregi et al. |
| 4,708,912 A | 11/1987 | Huppmann |
| 5,379,554 A | 1/1995 | Thurman et al. |
| 5,711,187 A | 1/1998 | Cole et al. |
| 6,151,778 A * | 11/2000 | Woolf et al. ............. 29/893.32 |
| 6,151,941 A | 11/2000 | Woolf et al. |

* cited by examiner

Primary Examiner—Daniel J. Jenkins
(74) Attorney, Agent, or Firm—Reising, Ethington, Barnes, Kisselle, Learman & McCulloch, P.C.

(57) ABSTRACT

A compacted and sintered gear blank is supported for rotation about a first axis adjacent a tool supported for rotation about a second axis transverse to the first axis. The tool has a series of gear cutting teeth and an adjacent set of gear densifying portions. The gear cutting teeth of the tool are moved into engagement with the powder metal gear blank to cut gear teeth into the blank. The tool is then shifted to bring the densifying portions of the tool into engagement with the teeth and the surfaces of the teeth densified by the tool.

4 Claims, 2 Drawing Sheets though the work piece 14 does not yet have preformed gear teeth that are ready for densification. The tool 18 is positioned with the gear tooth cutting portions 22 adjacent the work piece 14, and the

APPARATUS AND METHOD FOR FORMING POWDER METAL GEARS

BACKGROUND OF THE INVENTION

1. Technical Field

This invention relates generally to the making of powder metal gears, and more particularly to the cutting and densifying of the gear teeth.

2. Related Art

U.S. Pat. No. 4,708,912 discloses a method of manufacturing powder metal gears in which a sintered metal gear blank is mounted in a rolling machine for rotation about a first axis between a set of adjacent toothed rolling tools which are each mounted for rotation about second and third axes that are parallel to the first axis of the gear blank. Densification takes place through displacement of the gear blank material by the teeth of the rolling tools. The gear blank can be provided with preformed teeth which are subsequently densified by the rolling tools.

U.S. Pat. No. 5,711,187 discloses a method of densifying powder metal gears wherein a powder metal gear blank is mounted for rotation about a first axis adjacent a toothed rolling tool mounted for rotation about a second axis which is parallel to the first axis. The blank and tool are moved relatively toward one another to displace and densify the material of the gear teeth. The manner in which the teeth of the gear blank are pre-formed for subsequent densification is not disclosed.

It is an object of the present invention to simplify the manufacture of powder metal gears having densified gear teeth.

SUMMARY OF THE INVENTION AND ADVANTAGES

A method of manufacturing a powder metal gear according to a presently preferred embodiment of the invention comprises compacting and sintering powder metal to form a gear blank which is then supported for rotation about a first axis. A tool is supported for rotation about a second axis which is transverse to the first axis of the gear blank. A tool has a series of gear teeth cutting portions and a set of axially adjacent gear teeth surface densification portions. The tool is driven about the second axis and the gear tooth cutting portions are brought into engagement with the gear blank whereby teeth are cut into the gear blank through the removal of gear blank material to prepare a toothed gear blank. Without dismounting either the tool or toothed gear blank, the tool and the toothed gear blank are shifted relative to one another to bring the gear toothed surface densification portions of the tool into meshed engagement with the teeth of the toothed gear blank and the tool driven about the second axis to displace and densify the surface the gear teeth.

The invention has the advantage of providing a simple method for manufacturing powder metal gear teeth.

The invention has the further advantage of providing a method of forming powder metal gear teeth with great precision and repeatability, since both the cutting and densification features are provided on the tool and their position and movement controlled according to the invention such that they are presented to the gear blank without disturbing the fixtured relationship of the tooling gear blank. In other words, by combining the cutting and densification steps into a single operation using the tool with both cutting and densification features, greater control over the dimensional and physical properties of the resultant densified powder metal gear is achieved.

DRAWINGS

These and other features and advantages of the present invention will become more readily appreciated when considered in connection with the following detailed description and appended drawings, wherein.

DETAILED DESCRIPTION

Figure 1:
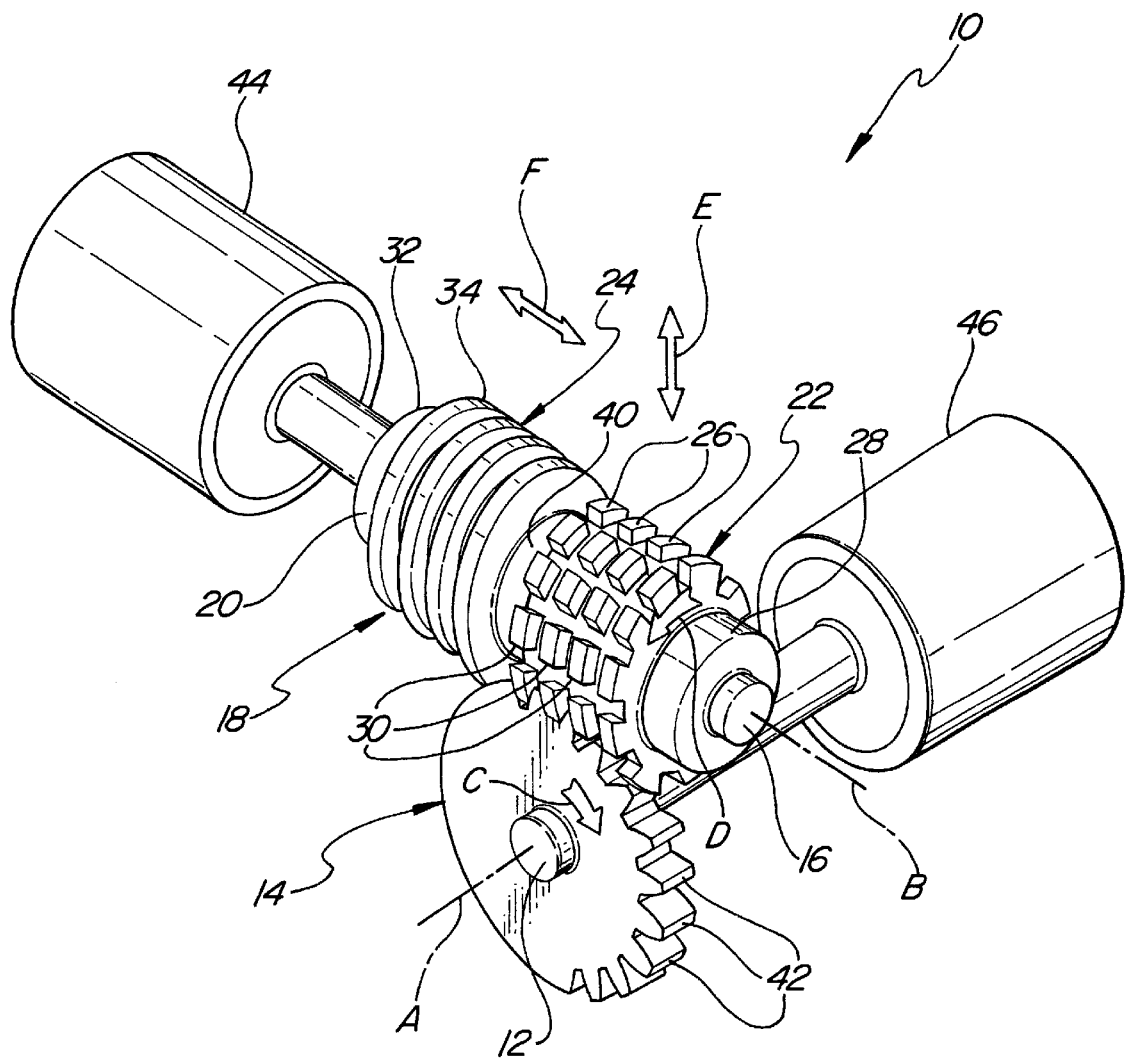
FIG. 1 is a schematic perspective view of an apparatus for forming powder metal gears according to a presently preferred method of the invention.
Figure 2:
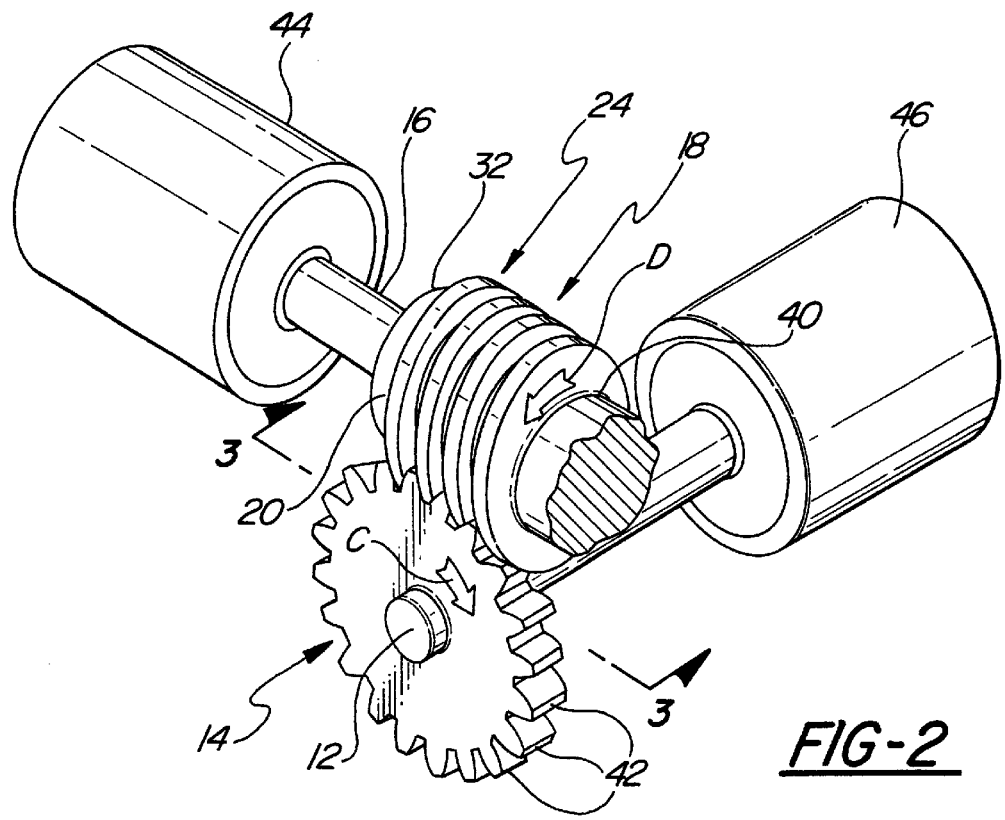
FIG. 2 is a fragmentary view like FIG. 1, but illustrating the densification of the gear teeth.

Referring initially to drawing FIGS. 1 and 2, an apparatus 10 for cutting and roll forming gears comprises a work piece spindle 12 having a rotation axis A for mounting a gear work piece or pre-form 14 for rotation about the axis A. The apparatus 10 further includes a tool spindle 16 adjacent the spindle 12 having a rotation axis B which is transverse to the rotation axis A. A gear forming die or tool 18 is mounted on the spindle 16 for rotation about the axis B in operative working relation to the work piece 14. The axis B is skewed relative to the axis A, such that they are non-parallel and non-intersecting.

The forming tool 18 comprises a generally cylindrical body 20 having a series of gear tooth cutting portions 22 and a series of gear tooth surface densification portions 24. The gear tooth cutting portions 22 comprise a series of cutting teeth 26 disposed about the body 20 adjacent one axial end 28 of the tool 18. The teeth 26 have leading cutting edges 30.

The gear tooth densification portions 24 are provided on a tool 18 axially adjacent the gear tooth cutting portions 22 adjacent an opposite end 32 of the tool 18. The gear tooth surface densification portions 24 comprises peripheral roll forming teeth in the form of a helical worm thread 34 which is free of any cutting surfaces that would act to cut, shear or remove material from the work piece 14. The worm thread 34 has leading and trailing forming faces 36, 28 (with respect to the direction of rotation of the tool 18) extending helically about the cylindrical body 20. The forming thread 34 may be a single start or multiple start thread. An axial space 40 separates the gear tooth cutting portions 22 from the gear tooth surface densification portions 24 and thus intermediate the ends 28, 32 of the tool 18. The portions 22, 24 may comprise a single piece structure of the tool 18, or, alternatively, may be separately fabricated and fixed to the spindle 16 for conjoint rotation about the axis B.

The work piece 14 is formed initially as a toothless gear blank and is compacted to shape from powder metal and then sintered in conventional manner from any of a number of alloyed and/or add mixed powders, such as elemental iron, iron alloys and individual or combined alloy additions such as copper, manganese, silicon, carbon, graphite, lubricants and binders, etc. The sintered blank work piece 14 is loaded on to the spindle 12 of the apparatus 10 for controlled rotation about the axis A in the direction of arrow C and/or in the opposite direction. When installed, the work piece 14 does not yet have preformed gear teeth that are ready for densification. The tool 18 is positioned with the gear tooth cutting portions 22 adjacent the work piece 14, and the spindles 12, 16 are moved relatively toward one another to bring the gear tooth cutting portions 22 into engagement with the outer peripheral surface of the work piece 14 to commence cutting gear teeth into the work piece 14, as illustrated in FIG. 1. During this operation, the tool 18 is rotated in the direction of arrow D about the axis B of the spindle 16, while rotating the work piece 14 about the axis A of the spindle 12. In this initial gear tooth cutting operation, the cutting teeth 26 engage and remove the portion of the powdered metal material of the work piece 14 to yield the undensified gear teeth 42 of the work piece 14. The tool 18 may be brought into and out of engagement with the work piece 14 by moving the tool 18 in the direction of arrow E.

Once the gear teeth 42 are cut in the work piece 14, the tool 18 is moved out of meshing engagement with the teeth 42 in the direction of arrow E. With the work piece 14 and tool 18 out of engagement, and without dismounting either the tool 18 or work piece 14 from their respective spindles 16, 12, the tool 18 and work piece 14 are relatively moved or shifted so as to locate the gear tooth surface densification portion 24 of the tool 18 adjacent the gear teeth 42. As best illustrated in FIG. 2, the relative shifting is preferably carried out by displacing the tool 18 along the axis B in the direction of arrow F. Once shifted, the gear tooth surface densification portions 24 of the tool 18 are moved into meshing engagement with the undensified gear teeth 42.

The spindle 16 is coupled to a drive motor 44 which operates to positively drive the spindle 16 and thus the tool 18 about the axis D in the direction of arrow D, or in the opposite direction if desired. The rotation of the tool 18 in the direction of arrow D imparts corresponding rotational force to the work piece 14 urging it to rotate in the direction of arrow C due to engagement between the teeth 42 and thread 34. According to the preferred embodiment of the invention, the work piece 14 is also positively driven by an associated motor 46 coupled to the work piece spindle 14 to enable independent control of the relative rotation and angular velocity of the work piece 14.

Figure 3:
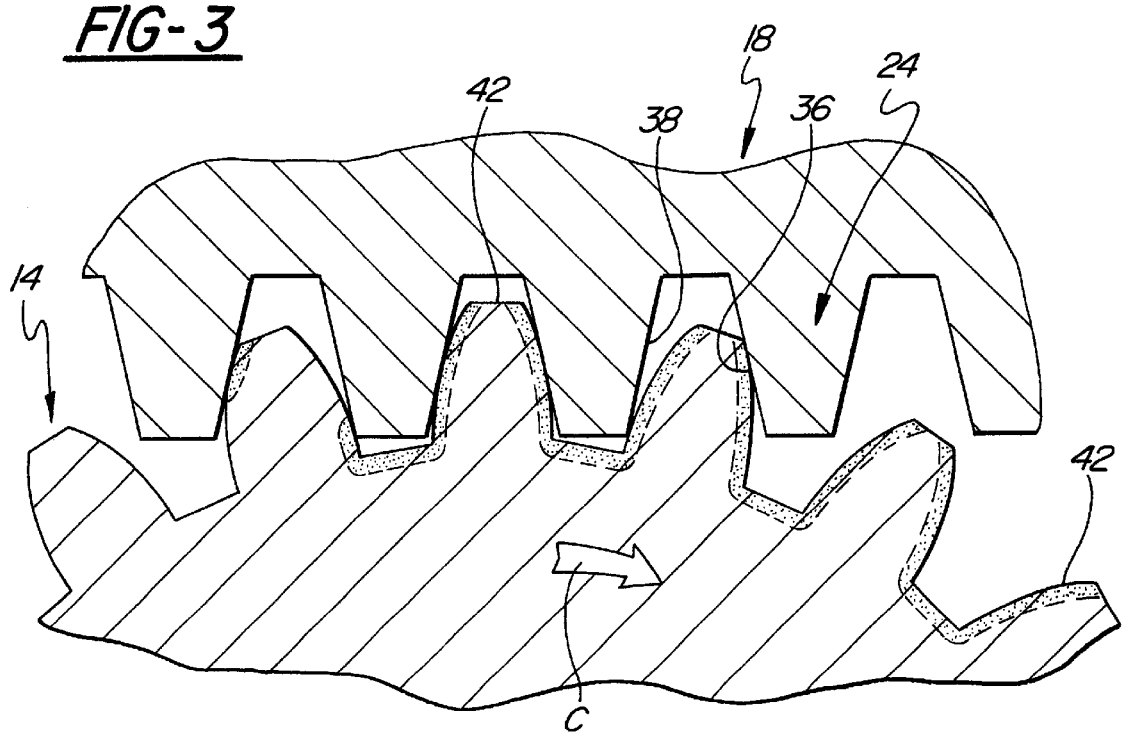
FIG. 3 is an enlarged fragmentary schematic sectional view taken generally along lines 3—3 of FIG. 2.

FIG. 3 illustrates the interaction that takes place between the worm thread 34 of the tool 18 and the teeth 42 of the work piece 14 during the densification step of the process. The forming faces 24, 26 of thread 22 engage the corresponding side faces of the gear teeth 42, causing the material at the surface of the gear teeth to be displaced which densities and hardens the gear teeth 42 to a predetermined depth as illustrated by the stippled regions of FIG. 3.

Positively driving the tool 18 and work piece 14 independently of one another enables adjustment in the directional loading applied by the thread 34 on the teeth 42 to accommodate various gear tooth configurations, including involute teeth, and control over the densification of the teeth so as to produce uniform densification of the teeth or densification of a particular region of the teeth more or less than other regions. The densification of the teeth 42 may be carried out in the same or similar manner described in U.S. Pat. No 6,151,941 commonly owned by the assignee of the present invention, the disclosure which is incorporated herein by reference.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A method of manufacturing a powder metal gear, comprising:

compacting and sintering powder metal to form a gear blank;

supporting the gear blank for rotation about first axis of the gear blank;

supporting a tool for rotation about a second axis transverse to the first axis, with the tool having a series of gear tooth cutting portions and an axially adjacent set of gear tooth surface densification portions;

driving the tool about the second axis and cutting gear teeth into the powder metal gear blank by the removal of gear blank material to prepare a toothed gear blank; and without dismounting either the tool or toothed gear blank, shifting the tool and the toothed gear blank relative to one another to bring the gear tooth surface densification portions of the tool into meshed engagement with the teeth of the toothed gear blank and driving the tool about the second axis to displace and densify the surface of the gear teeth.

2. The method of claim 1 wherein the compacting and sintering of the gear blank provides the gear blank with a generally cylindrical shape prior to the cutting of the gear teeth in the gear blank.

3. The method of claim 1 including positively driving the toothed gear blank during the densification of the gear teeth.

4. The method of claim 1 wherein the relative shifting of the tool and gear blank is carried out by moving the tool along its axis.

\* \* \* \* \*